(12) United States Patent
Zaccaria et al.

(10) Patent No.: US 11,486,318 B2
(45) Date of Patent: Nov. 1, 2022

(54) SYSTEM FOR CONFIRMING SHUTDOWN OF AN AIRCRAFT ENGINE

(71) Applicant: Airbus Operations (S.A.S.), Toulouse (FR)

(72) Inventors: Patrick Zaccaria, Toulouse (FR); David Boyer, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/317,321

(22) Filed: May 11, 2021

(65) Prior Publication Data
US 2021/0404393 A1    Dec. 30, 2021

(30) Foreign Application Priority Data

May 12, 2020    (FR) ...................................... 2004651

(51) Int. Cl.
*F02C 9/44*    (2006.01)
*F02C 7/232*    (2006.01)
(Continued)

(52) U.S. Cl.
CPC ................ *F02C 9/44* (2013.01); *B64D 31/04* (2013.01); *B64D 31/06* (2013.01); *F01D 21/00* (2013.01);
(Continued)

(58) Field of Classification Search
CPC ........ B64D 31/04; B64D 31/06; B64D 45/00; B64D 45/0005; B64D 31/14; F01D 21/14;
(Continued)

(56) References Cited

U.S. PATENT DOCUMENTS 3,938,320 A * 2/1976 Nelson ...................... F02C 7/26
416/30
4,297,742 A * 10/1981 Heitzman ............... F02D 17/04
361/194

(Continued)

FOREIGN PATENT DOCUMENTS

EP        2 258 927 A2    12/2010

OTHER PUBLICATIONS

French Search Report for Application No. 2004651 dated Jan. 27, 2021.

*Primary Examiner* — Alain Chau
(74) *Attorney, Agent, or Firm* — Jenkins, Wilson, Taylor & Hunt, PA

(57) ABSTRACT

To control an engine shutdown in an aircraft, a control system includes a fuel supply shut-off member, a control member with a set of switches, a first switch on an electrical power supply link of the fuel supply shut-off member and second switches connected to avionics of the aircraft, the set of switches switching position on an engine shutdown command. An engine shutdown confirmation unit includes a third switch on the electrical power supply link, the third switch in open position by default. The engine shutdown confirmation unit includes electronic circuitry configured to switch the third switch over to closed position when a predefined quantity Q of switches of the control member switches position within a sliding window of predefined duration and, otherwise, keeps the third switch in open position. Thus, it is ensured that the engine shutdown is intentional.

10 Claims, 4 Drawing Sheets

(51) Int. Cl.
  *F01D 21/00* (2006.01)
  *B64D 31/04* (2006.01)
  *B64D 31/06* (2006.01)
(52) U.S. Cl.
  CPC ........ *F02C 7/232* (2013.01); *F05D 2220/323* (2013.01); *F05D 2270/304* (2013.01); *F05D 2270/52* (2013.01)
(58) Field of Classification Search
  CPC .... F02C 9/26; F02C 9/263; F02C 9/28; F02C 9/44; F02C 9/46; F02C 9/32
  See application file for complete search history.

(56) References Cited

U.S. PATENT DOCUMENTS

| | | | | |
|---|---|---|---|---|
| 5,440,490 | A * | 8/1995 | Summerfield | F02C 9/46 701/99 |
| 7,043,896 | B2 * | 5/2006 | Matthews | G05B 9/03 60/39.091 |
| 7,091,629 | B2 * | 8/2006 | Hawkins | H02P 9/08 307/10.6 |
| 7,100,378 | B2 * | 9/2006 | Matthews | F02C 9/46 60/779 |
| 8,733,398 | B2 * | 5/2014 | Henson | F02C 7/232 251/129.01 |
| 9,799,151 | B2 * | 10/2017 | Olson | F02C 9/46 |
| 10,208,620 | B2 | 2/2019 | Montoya et al. | |
| 10,676,209 | B1 * | 6/2020 | Pezalla | B64D 45/00 |
| 2004/0262995 | A1 * | 12/2004 | Hawkins | H02P 9/08 307/10.6 |
| 2005/0109038 | A1 | 5/2005 | Matthews | |
| 2006/0156736 | A1 * | 7/2006 | Matthews | G05B 9/03 60/779 |
| 2010/0288951 | A1 * | 11/2010 | Henson | F02C 9/26 251/129.01 |
| 2016/0318620 | A1 * | 11/2016 | Olson | F01D 21/14 |
| 2020/0047913 | A1 * | 2/2020 | Shavit | G06Q 10/0631 |
| 2020/0271018 | A1 * | 8/2020 | Mccarthy | F01D 21/20 |
| 2021/0317790 | A1 * | 10/2021 | Ziolkowski | F02C 9/28 |

* cited by examiner

SYSTEM FOR CONFIRMING SHUTDOWN OF AN AIRCRAFT ENGINE

CROSS-REFERENCE TO RELATED APPLICATION

This application claims priority to French patent application number 20 04651 filed on May 12, 2020, the entire disclosure of which is incorporated by reference herein.

TECHNICAL FIELD

The field of the disclosure herein is confirmation of shutdown of an engine of an aircraft, and a method implemented by such a system.

BACKGROUND

In many aircraft, the pilots can order the shutdown of an engine intended to propel the aircraft by actuating a dedicated control member in the cockpit. For example, this engine shutdown control member is incorporated in a master lever intended for engine control. When actuated, this engine shutdown control member trips a set of switches, at least one switch is actuated to electrically power an engine fuel supply shut-off member, such as, for example, a fuel shut-off solenoid valve, and several other switches are actuated to inform other members of the aircraft, such as FADEC (Full Authority Digital Engine Control) system computers, of the engine shutdown. In this way, the fuel supply of the engine is shut off, and all of the members of the aircraft involved in propulsion management are correctly informed of the shutdown of the engine.

Although this mechanism for triggering shutdown of an aircraft engine is proven, it is still desirable to augment the safety mechanisms in the aeronautic field and confirm that the actuation of an engine shutdown command, notably in flight, does in fact correspond to the intention of the pilot.

SUMMARY

To this end, a control system is disclosed for controlling an engine shutdown of a propulsion engine of an aircraft, comprising: at least one fuel supply shut-off member, such that, when the fuel supply shut-off member is electrically powered, the fuel supply of the propulsion engine is stopped; a control member, which is intended to be placed in the cockpit of the aircraft and which comprises a set of switches, namely at least one first switch on an electrical power supply link of the fuel supply shut-off member or members and a plurality of second switches intended to be connected to avionics of the aircraft, the first switch or switches being in open position by default, the set of switches switching position on an engine shutdown command. The control system further comprises an engine shutdown confirmation unit comprising at least one third switch placed on the electrical power supply link, the third switch or switches being in open position by default. Furthermore, the engine shutdown confirmation unit comprises electronic circuitry configured to switch the third switch or switches over to closed position when a predefined quantity Q of switches out of the set of switches of the control member switches position within a sliding time frame of predefined duration and, otherwise, keeps the third switch or switches in open position. Thus, it is ensured that the engine shutdown does indeed correspond to the intention of the pilot.

According to a particular embodiment, the electronic circuitry is also configured to: be set to standby for a predefined duration representative of a reaction time inertia of the propulsion engine on engine shutdown; check whether the propulsion engine is in logical shut-off mode, and, if such is the case, the electronic circuitry keeps the third switch or switches in closed position, and, otherwise, the electronic circuitry switches the third switch or switches back to open position.

According to a particular embodiment, the electronic circuitry determines that the propulsion engine is in logical shut-off mode when sensors confirm that the configuration of the fuel supply shut-off members is in a fuel supply shut-off state.

According to a particular embodiment, the electronic circuitry determines that the propulsion engine is in logical shut-off mode when sensors confirm that a speed of the propulsion engine is dropping.

According to a particular embodiment, the engine shutdown confirmation unit is also placed at the output of the second switches, inserted between the control member and the avionics of the aircraft.

According to a particular embodiment, the third switch or switches are electromagnetic relays.

Also proposed is an aircraft comprising, at least, a propulsion engine and a control system as previously described.

According to a particular embodiment, the electronic circuitry is configured to keep the third switch or switches in closed position and to not monitor the switching-over of the set of switches of the control member when the speed of the aircraft is below a predefined speed threshold.

According to a particular embodiment, the electronic circuitry is configured to keep the third switch or switches in closed position and to not monitor the switching-over of the set of switches of the control member in the take-off phase of the aircraft.

According to a particular embodiment, the fuel supply shut-off member is a high-pressure shut-off solenoid valve and/or a low-pressure shut-off solenoid valve.

BRIEF DESCRIPTION OF THE DRAWINGS

The features of the disclosure herein mentioned above, and others, will become more clearly apparent on reading the following description of an exemplary embodiment, the description being given in relation to the attached drawings, in which.

DETAILED DESCRIPTION

Figure 1:
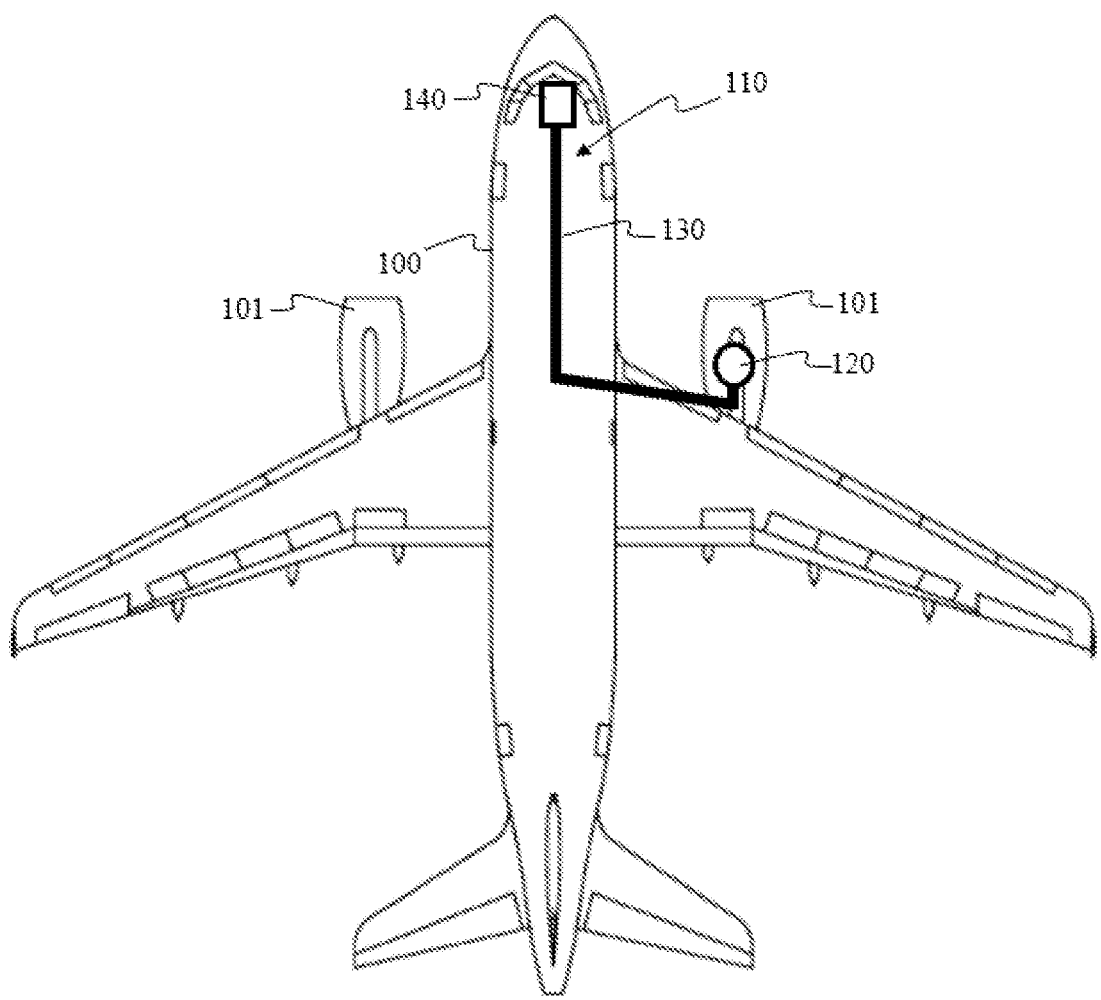
FIG. 1 schematically illustrates, in plan view, an aircraft equipped with an engine control system for each propulsion engine of the aircraft.

FIG. 1 schematically illustrates, in plan view, an aircraft 100. The aircraft 100 comprises at least one propulsion engine 101, such as, for example, a turbojet engine mounted under each wing of the aircraft 100. The aircraft 100 comprises a cockpit in which at least one pilot is intended to be installed to manoeuvre the aircraft 100. The cockpit thus comprises equipment 140, notably control members and onboard instruments, allowing the aircraft 100 to be manoeuvred. The aircraft 100 also comprises avionics that make it possible to ensure the correct operation of the aircraft 100 and to provide assistance in piloting, notably FADEC system computers. A FADEC system is a digital regulation system which interfaces the cockpit with a propulsion engine 101 in managing engine parameters (thrust management, etc.) and in transmitting information from sensors of the propulsion engine 101 to the onboard instruments.

The aircraft 100 thus comprises, for each propulsion engine 101, an engine control system 110 comprising a control member 200, in the cockpit, which is intended to allow a pilot of the aircraft 100 to order the shutdown of the propulsion engine 101. The engine control system 110 further comprises at least one fuel supply shut-off member 120 connected to the control member 200. When the fuel supply shut-off member 120 is electrically powered, the fuel supply to the propulsion engine 101 is stopped, which results in the engine shutdown.

The fuel supply shut-off member 120 is electrically powered by an electrical power supply link 130 on which the control member 200 is placed (i.e., the electrical power supply passes through the control member 200). The electrical power supply link 130 can be composed of several parallel electrical cables for electrically powering, independently, several fuel supply shut-off members 120.

The control member 200 is, for example, an engine master lever EML, or incorporated therein.

The fuel supply shut-off member 120 is preferably installed close to the propulsion engine 101 and is typically a high-pressure shut-off solenoid valve HPSOV. The fuel supply shut-off member 120 can also be a low-pressure shut-off solenoid valve LPSOV, situated upstream of the high-pressure shut-off solenoid valve HPSOV in the fuel supply circuit of the propulsion engine 101.

Figure 2:
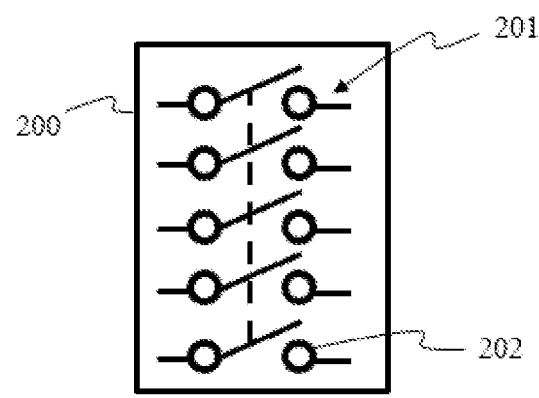
FIG. 2 schematically illustrates a set of switches of a control member of the engine control system.

As schematically represented in FIG. 2, the control member 200 comprises a set of switches 201. At least one switch 202 out of the set of switches 201 is on the electrical power supply link 130 (i.e., the electrical power supply passes through the switch or switches 202). By default, the switch or switches 202 are in open position (i.e., no electrical power supply via the electrical power supply link 130). The set of switches 201 comprises several other switches connected to other members of the aircraft, for example to an FADEC system and to an avionics communication network of AFDX (Avionics Full DupleX) switched Ethernet type. For example, the set of switches 201 comprises several other switches connected to avionics of the aircraft, and notably situated on an electrical line connecting the control member 200 and the avionics. When the pilot actuates the control member 200 to order an engine shutdown, the switches of the set of switches 201 switch position. Notably, the switch or switches 202 switch to closed position to electrically power the fuel supply shut-off member or members 120, thus resulting in the engine shutdown. Furthermore, the switching of position of the other switches informs the avionics of the engine shutdown.

Figure 3A:
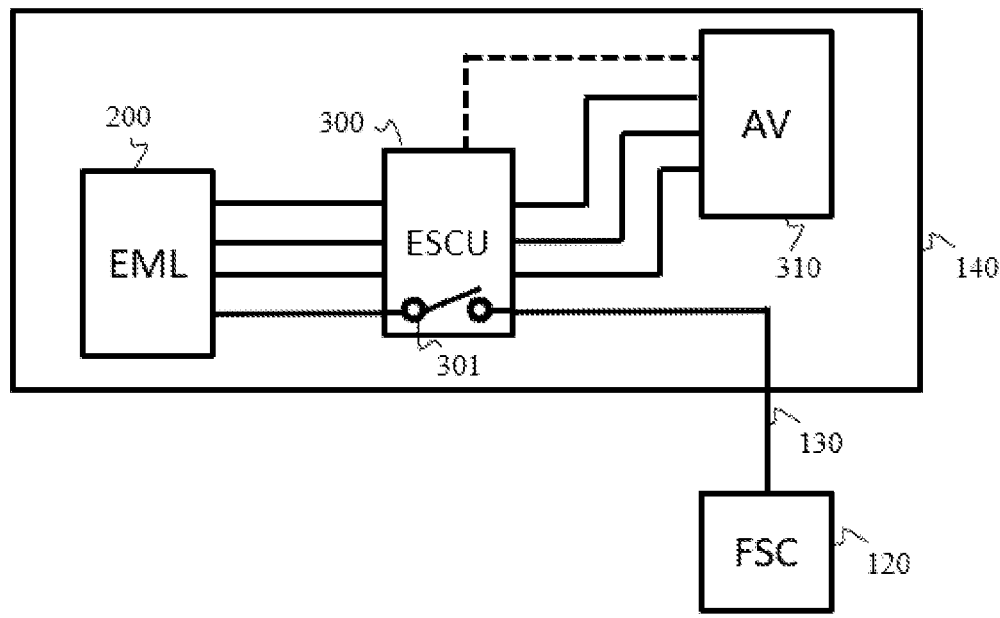
FIG. 3A schematically illustrates a first arrangement of an engine shutdown confirmation unit in the engine control system.
Figure 3B:
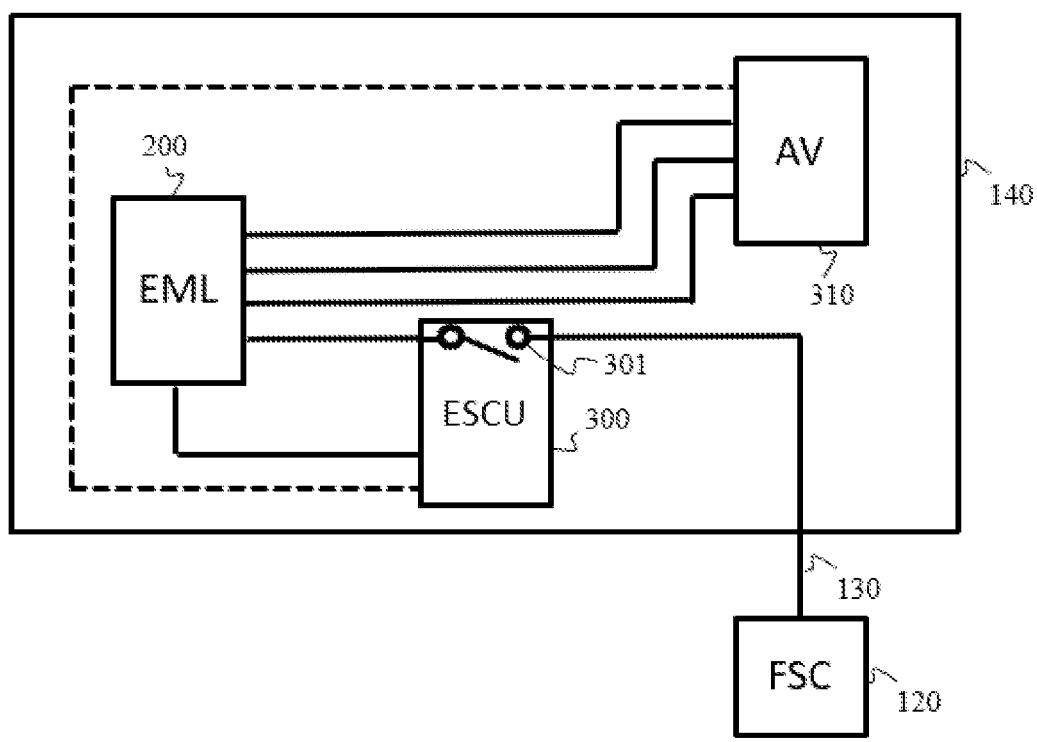
FIG. 3B schematically illustrates a second arrangement of an engine shutdown confirmation unit in the engine control system.

As schematically illustrated in FIGS. 3A and 3B, the engine control system 110 further comprises an engine shutdown confirmation unit ESCU 300. The engine shutdown confirmation unit ESCU 300 is placed between the control member 200, more particularly the switch or switches 202, and the fuel supply shut-off member or members 120 on the electrical power supply link 130. The engine shutdown confirmation unit ESCU 300 comprises at least one switch 301, for example in the form of an electromechanical relay, on the electrical power supply link 130 (i.e., the electrical power supply passes through the switch or switches 301). By default, the switch or switches 301 are in open position (i.e., no electrical power supply on the electrical power supply link 130).

The engine shutdown confirmation unit ESCU 300 monitors the set of switches 201. More particularly, the engine shutdown confirmation unit ESCU 300 monitors the switching of position of the set of switches 201. When at least a predefined quantity Q of switches out of the set of switches 201 switches position within a sliding time frame TF of predefined duration T (for example, 1 second), the engine shutdown confirmation unit ESCU 300 switches the switch or switches 301 over to closed position and thus allows the electrical power supply via the electrical power supply link 130; otherwise, the engine shutdown confirmation unit ESCU 300 leaves the switch or switches 301 in open position and thus does not allow the electrical power supply via the electrical power supply link 130, whatever the position (open or closed) of the switch or switches 202.

The quantity Q and the duration T of the sliding time frame STF are defined to be representative of a mechanical actuation by the pilot of the control member 200. Trips of the set of switches which would not correspond to the intention of the pilot are thus eliminated.

To monitor the switching of position of the set of switches 201, the engine shutdown confirmation unit ESCU 300 can be placed at the output of the set of switches 201, as schematically illustrated in FIG. 3A. The engine shutdown confirmation unit ESCU 300 is then inserted between the control member 200 and the avionics AV 310.

As a variant, as schematically illustrated in FIG. 3B, the engine shutdown confirmation unit ESCU 300 receives from the control member 200, using an internal monitoring unit of the control member 200, status information on the set of switches 201.

The engine shutdown confirmation unit ESCU 300 can also be incorporated in the avionics AV 310.

Figure 4:
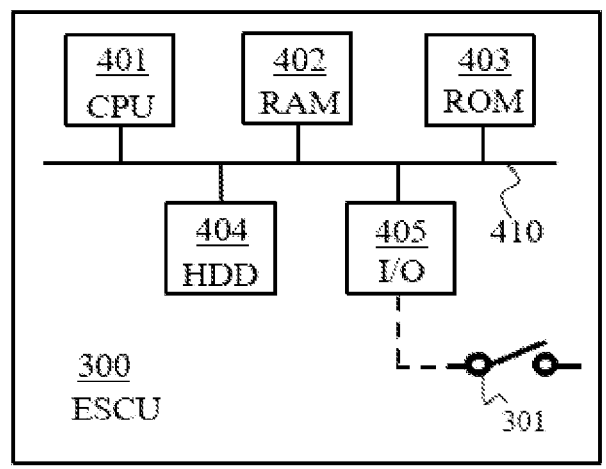
FIG. 4 schematically illustrates an exemplary hardware arrangement of the engine shutdown confirmation unit.

FIG. 4 schematically illustrates a hardware arrangement of the engine shutdown confirmation unit ESCU 300, which then comprises, linked by a communication bus 410; a processor or CPU (Central Processing Unit) or microcontroller 401; a random access memory RAM 402; a read only memory ROM 403, for example of EEPROM (Electrically-Erasable Programmable ROM) or Flash type; a storage unit 404, such as a hard disk drive HDD, or a storage medium reader, such as an SD (Secure Digital) card reader; and a set of inputs-outputs VO 405. At least one output of the inputs-outputs I/O 405 controls the switch or switches 301. A plurality of inputs-outputs of the inputs-outputs I/O 405 can serve as intermediaries between the set of switches 201 and the avionics AV 310 (see FIG. 3A). At least one input of the inputs-outputs I/O 405 can be used to receive status information on the set of switches 201 originating from the internal monitoring unit of the control member 200 (see FIG. 38). At least one input of the inputs-outputs I/O 405 can be used to receive information from the avionics AV 310.

The processor 401 is capable of executing instructions loaded into the random access memory 402 from the read only memory 403, an external memory, a storage medium (such as an SD card), or a communication network. When the engine shutdown confirmation unit ESCU 300 is powered up, the processor 401 is capable of reading instructions from the random access memory 402 and of executing them. These instructions form a computer programme driving the implementation, by the processor 401, of all or part of the steps and operations described here in relation to the engine shutdown confirmation unit ESCU 300.

All or part of the steps and operations described here in relation to the engine shutdown confirmation unit ESCU 300 can thus be implemented in software form by the execution of a set of instructions by a programmable machine, for example a processor of DSP (Digital Signal Processor) type or a microcontroller, or be implemented in hardware form by a machine or a component (chip) or a set of components (chipset), for example an FPGA (Field Programmable Gate Array) or ASIC (Application Specific Integrated Circuit) component. Generally, the engine shutdown confirmation unit ESCU 300 comprises electronic circuitry designed and configured to implement, in software and/or hardware form, the operations and steps described here in relation to the engine shutdown confirmation unit ESCU 300.

Figure 5:
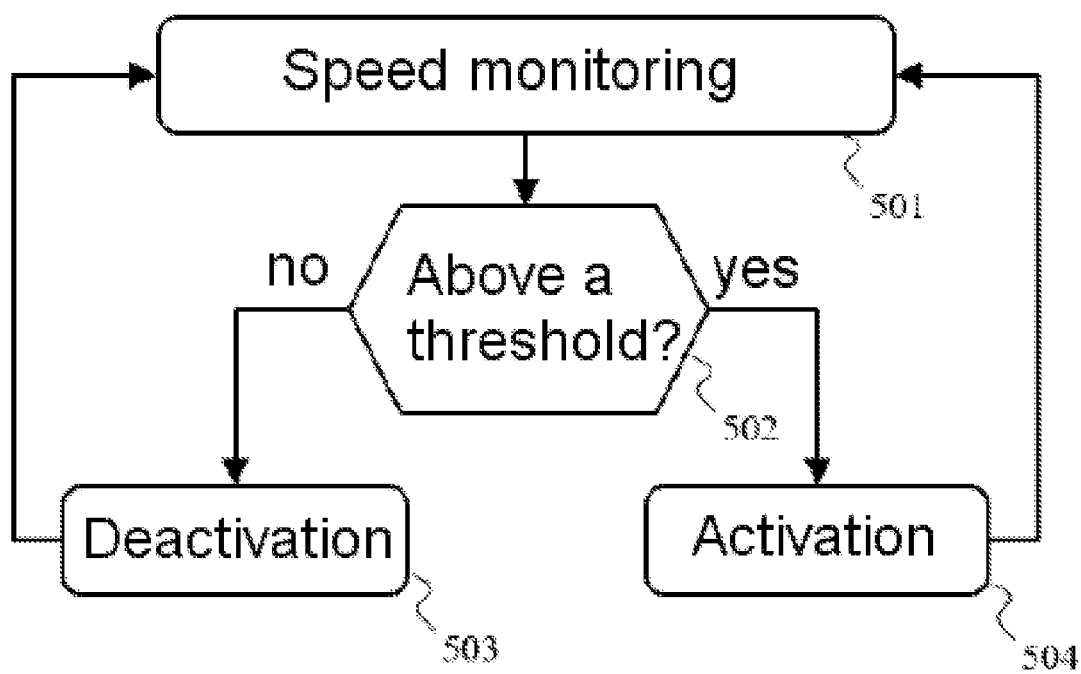
FIG. 5 schematically illustrates an algorithm for selective activation of a monitoring of the set of switches, implemented by the engine shutdown confirmation unit.

In a particular embodiment, the monitoring of the set of switches 201 by the engine shutdown confirmation unit ESCU 300 is activated selectively. This approach is schematically illustrated in FIG. 5.

In a step 501, the engine shutdown confirmation unit ESCU 300 monitors the speed of the aircraft 100. The engine shutdown confirmation unit ESCU 300 is for example informed thereof by the avionics AV 310 (dotted lines in FIGS. 3A and 3B).

In a step 502, the engine shutdown confirmation unit ESCU 300 compares the speed of the aircraft 100 to a predefined speed threshold TH, for example equal to 80 knots, in other words close to 150 km/h. If the speed of the aircraft 100 is above the predefined speed threshold TH, a step 504 is performed; otherwise, a step 503 is performed.

In the step 503, the engine shutdown confirmation unit ESCU 300 deactivates (if it is not already deactivated) the monitoring of the set of switches 201. The switch or switches 301 are then in closed position. The decision as to whether or not to electrically power the fuel supply shut-off member or members 120 is therefore left to the control member 200. Then, the step 501 is repeated.

In the step 504, the engine shutdown confirmation unit ESCU 300 activates (if it is not already activated) the monitoring of the set of switches 201 and is therefore set to the configuration to have to confirm the engine shutdown commands originating from the control member 200. The switch or switches 301 are then in open position by default. The switch or switches 301 switch over to closed position when the engine shutdown confirmation unit ESCU 300 confirms an engine shutdown command. The decision as to whether or not to electrically power the fuel supply shut-off member or members 120 must therefore be confirmed by the engine shutdown confirmation unit ESCU 300. Then, the step 501 is repeated.

Figure 6:
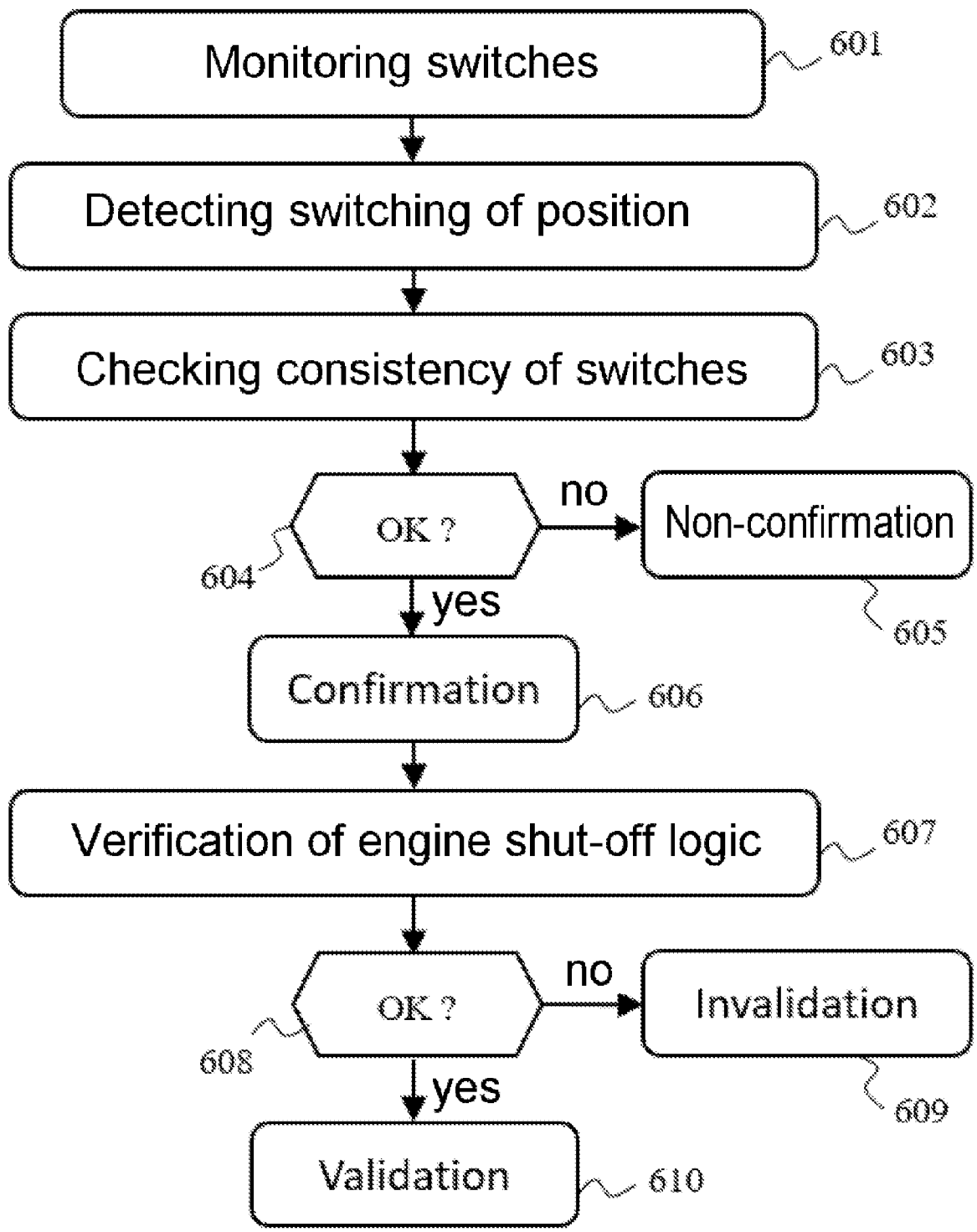
FIG. 6 schematically illustrates an engine shutdown command confirmation algorithm, implemented by the engine shutdown confirmation unit.

FIG. 6 schematically illustrates an engine shutdown command confirmation algorithm, implemented by the engine shutdown confirmation unit ESCU 300. When the algorithm of FIG. 6 is launched, the switch or switches 301 are in open position.

In a step 601, the engine shutdown confirmation unit ESCU 300 monitors the set of switches 201.

In a step 602, the engine shutdown confirmation unit ESCU 300 detects the switching of position of at least one switch out of the set of switches 201 of the control member 200.

In a step 603, the engine shutdown confirmation unit ESCU 300 checks the consistency of positioning of the switches of the set of switches 201. In other words, the engine shutdown confirmation unit ESCU 300 compares the quantity of switches, out of the set of switches 201, which have switched position within the sliding time frame STF of duration T with the predefined quantity Q.

In a step 604, the engine shutdown confirmation unit ESCU 300 checks whether the quantity of switches which have switched position within the sliding time frame STF is greater than or equal to the predefined quantity Q. If such is the case, a step 606 is performed; otherwise, a step 605 is performed.

In the step 605, the engine shutdown confirmation unit ESCU 300 does not confirm that the switching-over of switches corresponds to an intentional engine shutdown command from the pilot. The engine shutdown confirmation unit ESCU 300 keeps the switch or switches 301 in open position.

In the step 606, the engine shutdown confirmation unit ESCU 300 confirms the engine shutdown command and switches the switch or switches 301 over to closed position. The electrical power supply of the fuel supply shut-off member or members 120 therefore depends on the position of the switch or switches 202 out of the set of switches 201.

Preferentially, in a step 607, the engine shutdown confirmation unit ESCU 300 is set to standby for a predefined duration representative of a reaction inertia of the propulsion engine 101 on engine shutdown (for example a few seconds), then checks whether the propulsion engine 101 is in a logical shut-off mode. According to a first embodiment, the engine shutdown confirmation unit ESCU 300 checks the state of the fuel supply shut-off member or members 120. The configuration of the fuel supply shut-off members 120 should be in fuel supply shut-off state. Sensors, connected to the avionics AV 310, can be used to identify the state of the fuel supply shut-off member or members 120, and the avionics AV 310 informs the engine shutdown confirmation unit ESCU 300 thereof. According to a second embodiment, the engine shutdown confirmation unit ESCU 300 checks that a speed (speed N2 or N3, for example) of the propulsion engine 101 is dropping (with a negative slope greater than a predefined threshold representative of an engine shutdown). According to a third embodiment, the engine shutdown confirmation unit ESCU 300 checks that a power supply current is actually flowing through the power supply link 130.

Then, in a step 608, the engine shutdown confirmation unit ESCU 300 checks whether the engine shut-off logic conditions are fulfilled. If such is the case, a step 610 is performed; otherwise, a step 609 is performed.

In the step 609, the engine shutdown confirmation unit ESCU 300 detects a suspected false contact situation on the control member 200, invalidates the engine shutdown command and switches the switch or switches 301 over to open position. The engine shutdown confirmation unit ESCU 300 prohibits the electrical power supply to the fuel supply shut-off member or members 120 by the control member 200 at least until the end of the flight or until the aircraft 100 is immobilized or until a maintenance operation is carried out on the control member 200, the engine shutdown confirmation unit ESCU 300 being informed thereof by the avionics AV 310.

In the step 610, the engine shutdown confirmation unit ESCU 300 validates the engine shutdown command and keeps the switch or switches 301 in closed position.

The algorithm of FIG. 6 can be reinitialized when a quantity Q' of switches out of the set of switches 201 are detected to be in their default position. It is also possible to reinitialize the algorithm of FIG. 6 when, following an engine shutdown, the avionics AV 310 informs the engine shutdown confirmation unit ESCU 300 that an engine restart has taken place.

It should be noted that the engine shutdown confirmation unit ESCU 300 as described above is independent of any fire-protection architecture in the propulsion engine 101. The pilot can thus order, in case of an engine fire, the triggering of the low-pressure shut-off solenoid valve LPSOV unprevented by the engine shutdown confirmation unit ESCU 300.

Furthermore, in a particular embodiment, the engine shutdown confirmation unit ESCU 300 can force the switch or switches 301 to open position during certain maneuvers of the aircraft 100. Notably, the engine shutdown confirmation unit ESCU 300 can be informed by the avionics AV 310 that the aircraft 100 is in take-off phase and force the switch or switches 301 to open position for as long as the take-off phase is in progress. That prevents engine shutdown by the control member 200 during the take-off phase.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" by either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control system for controlling an engine shutdown of a propulsion engine of an aircraft, comprising:
    at least one fuel supply shut-off member, such that, when the at least one fuel supply shut-off member is electrically powered, the fuel supply of the propulsion engine is stopped;
    a control member, which is configured to be placed in a cockpit of the aircraft and comprises a set of switches, the set of switches comprising at least one first switch on an electrical power supply link of the at least one fuel supply shut-off member and a plurality of second switches configured to be connected to avionics of the aircraft, the at least one first switch being in an open position by default, the set of switches switching position on an engine shutdown command;
    an engine shutdown confirmation unit comprising at least one third switch placed on the electrical power supply link, the at least one third switch being in an open position by default;
    wherein the engine shutdown confirmation unit comprises electronic circuitry configured to switch the at least one third switch over to a closed position when a predefined quantity Q of switches out of the set of switches of the control member switches position within a time frame of predefined duration and, otherwise, keeps the at least one third switch in the open position.

2. The control system according to claim 1, wherein the electronic circuitry is configured to:
    be set to standby for a predefined duration representative of a response time of the propulsion engine on engine shutdown;
    check whether the propulsion engine is going into a shut-off mode; and
    keep the at least one third switch in the closed position when the propulsion engine is going into the shut-off mode and, otherwise, to switch the at least one third switch back to the open position.

3. The control system according to claim 2, wherein the electronic circuitry is configured to determine that the propulsion engine is going into the shut-off mode when sensors confirm that the configuration of the at least one fuel supply shut-off member is in a fuel supply shut-off state.

4. The control system according to claim 2, wherein the electronic circuitry is configured to determine that the propulsion engine is going into the shut-off mode when sensors confirm that a speed of the propulsion engine is dropping.

5. The control system according to claim 1, wherein the engine shutdown confirmation unit is placed at an output of the second switches, inserted between the control member and the avionics of the aircraft.

6. The control system according to claim 1, wherein the at least one third switch are electromagnetic relays.

7. An aircraft comprising, at least, a propulsion engine and a control system according to claim 1.

8. The aircraft according to claim 7, wherein the electronic circuitry is configured to keep the at least one third switch in the closed position and to not monitor switching-over of the set of switches of the control member when a speed of the aircraft is below a predefined speed threshold.

9. The aircraft according to claim 7, wherein the electronic circuitry is configured to keep the at least one third switch in the closed position and to not monitor switching-over of the set of switches of the control member in a take-off phase of the aircraft.

10. The aircraft according to claim 7, wherein the at least one fuel supply shut-off member is a high-pressure shut-off solenoid valve and/or a low-pressure shut-off solenoid valve.

* * * * *